United States Patent
Gavade et al.

(10) Patent No.: US 9,467,721 B2
(45) Date of Patent: Oct. 11, 2016

(54) ENHANCED FAST-FORWARD AND REWIND VISUAL FEEDBACK FOR HLS CONTENT

(71) Applicant: Verizon Patent and Licensing Inc., Arlington, VA (US)

(72) Inventors: Sameer Gavade, Irving, TX (US); Mandar Dhonsale, Frisco, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 75 days.

(21) Appl. No.: 14/256,627

(22) Filed: Apr. 18, 2014

(65) Prior Publication Data
US 2015/0304692 A1  Oct. 22, 2015

(51) Int. Cl.
| H04N 5/445 | (2011.01) |
|---|---|
| H04N 21/2387 | (2011.01) |
| H04N 21/262 | (2011.01) |
| H04N 21/61 | (2011.01) |
| H04N 21/482 | (2011.01) |
| H04N 21/845 | (2011.01) |

(52) U.S. Cl.
CPC .... *H04N 21/2387* (2013.01); *H04N 21/26258* (2013.01); *H04N 21/4825* (2013.01); *H04N 21/6125* (2013.01); *H04N 21/8456* (2013.01); H04N 21/26283 (2013.01)

(58) Field of Classification Search
CPC .......... H04N 5/44543; H04N 21/482; H04N 21/4622; H04N 21/47202; H04N 7/17318
USPC .......... 725/44–54, 87–93, 114–116; 709/217–232
See application file for complete search history.

(56) References Cited

U.S. PATENT DOCUMENTS

| 7,127,735 B1 * | 10/2006 | Lee .................... H04N 7/17336 348/E7.073 |
|---|---|---|
| 7,797,720 B2 | 9/2010 | Gopalakrishnan et al. |
| 7,818,444 B2 * | 10/2010 | Brueck ............. H04L 29/06027 709/231 |
| 8,151,308 B1 * | 4/2012 | Chauvin ............ H04N 21/2387 709/219 |
| 8,356,324 B2 * | 1/2013 | Rajakarunanayake .. H04N 5/76 709/219 |
| 8,763,053 B1 * | 6/2014 | Goode ............. H04N 21/23109 725/92 |
| 8,925,021 B2 * | 12/2014 | Ma .................... H04N 21/23430 725/86 |
| 8,966,513 B2 * | 2/2015 | John ................ H04N 21/42203 709/231 |
| 9,172,763 B2 * | 10/2015 | German .................. H04L 67/22 |
| 9,332,296 B2 * | 5/2016 | Ma ..................... H04N 21/4147 |
| 2004/0040041 A1 * | 2/2004 | Crawford ............. H04N 21/235 725/88 |
| 2004/0103429 A1 * | 5/2004 | Carlucci ................ H04N 7/163 725/32 |

(Continued)

*Primary Examiner* — Annan Shang

(57) ABSTRACT

A server device may receive a playback request that identifies particular content, a first segment file associated with the particular content, and a playback speed; and generate a playlist based on receiving the playback request. When generating the playlist, the server device may determine one or more second segment files, associated with the particular content, based on the playback speed and the first segment file; determine, based on the playback speed, a sequence in which the first segment file and the one or more second segment files should be played; and generate a list identifying the first segment file and the one or more second segment files. The list may be sorted based on the sequence. The one or more second segment files may be listed subsequent to the first second file. The server device may store or output the playlist.

20 Claims, 10 Drawing Sheets

(56) References Cited

U.S. PATENT DOCUMENTS

| | | | |
|---|---|---|---|
| 2006/0080167 A1* | 4/2006 | Chen | G06Q 30/02 705/14.68 |
| 2006/0174290 A1* | 8/2006 | Garwin | H04N 7/17318 725/88 |
| 2007/0242240 A1* | 10/2007 | Webb | G03B 21/00 353/121 |
| 2008/0256255 A1* | 10/2008 | Mordovskoi | H04N 21/2381 709/231 |
| 2009/0080864 A1* | 3/2009 | Rajakarunanayake | H04N 5/76 386/200 |
| 2009/0178090 A1* | 7/2009 | Oztaskent | H04N 7/17336 725/90 |
| 2010/0040349 A1* | 2/2010 | Landy | G11B 27/005 386/353 |
| 2011/0035507 A1* | 2/2011 | Brueck | H04L 29/06027 709/231 |
| 2011/0302238 A1* | 12/2011 | Sood | G11B 27/005 709/203 |
| 2012/0117225 A1* | 5/2012 | Kordasiewicz | H04L 65/1083 709/224 |
| 2014/0025710 A1* | 1/2014 | Sarto | G06F 17/3002 707/823 |
| 2014/0089806 A1* | 3/2014 | Weast | G06F 3/0481 715/730 |
| 2014/0230003 A1* | 8/2014 | Ma | H04N 21/231 725/115 |

* cited by examiner

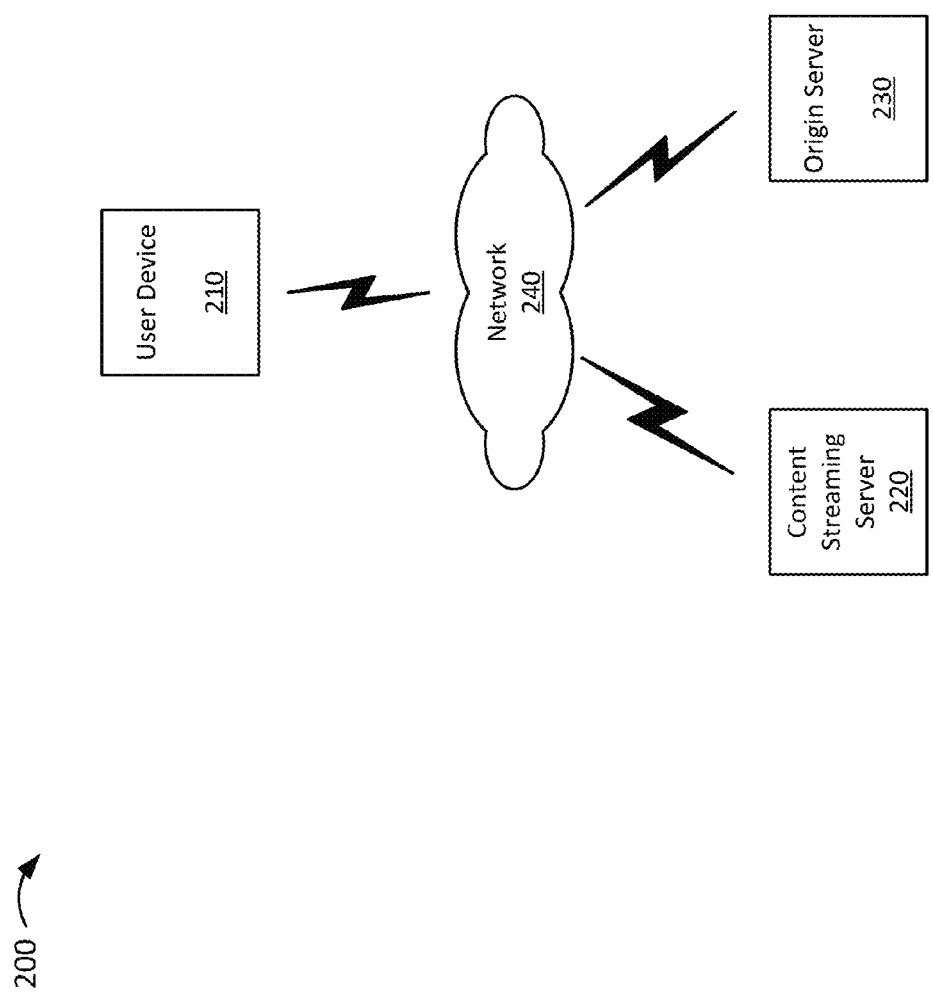

ENHANCED FAST-FORWARD AND REWIND VISUAL FEEDBACK FOR HLS CONTENT

BACKGROUND

A user device can receive content via hypertext transfer protocol (HTTP) live streaming (HLS) techniques in which the user device plays sequentially plays segments of content. Each segment may be identified in a playlist, which may identify multiple versions of each segment. Each version may be encoded at different bit rates, and the user device may select a particular version to play based on network conditions.

BRIEF DESCRIPTION OF THE DRAWINGS

FIG. 2 illustrates an example environment in which systems and/or methods, described herein, may be implemented;

DETAILED DESCRIPTION OF THE PREFERRED EMBODIMENTS

The following detailed description refers to the accompanying drawings. The same reference numbers in different drawings may identify the same or similar elements.

When delivering content (e.g., video content) via hypertext transfer protocol (HTTP) live streaming (HLS) techniques, visual feedback during fast-forward and rewind operations may be limited to thumbnails rather than a full-screen view of content playback. Systems and/or methods, as described herein, may generate a playlist, which, when played by a user device, may cause the user device to display full-screen content during fast-forward and rewind operations (e.g., the same size at which the content is played at a normal speed).

Figure 1A:
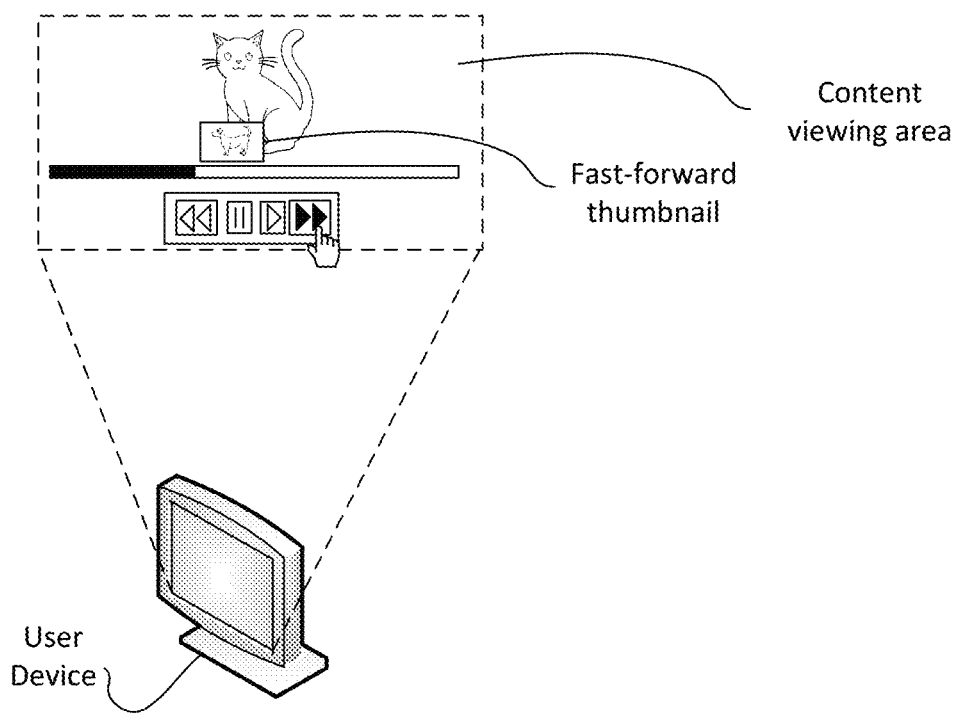
FIG. 1A illustrates a situation where enhanced visual feedback of fast-forward and rewind operations may be desirable.

FIG. 1A illustrates a situation where enhanced visual feedback of fast-forward and rewind operations may be desirable. As shown in FIG. 1A, visual feedback during fast-forward and rewind operations may be limited to thumbnails rather than a full-screen view of content playback.

Figure 1B:
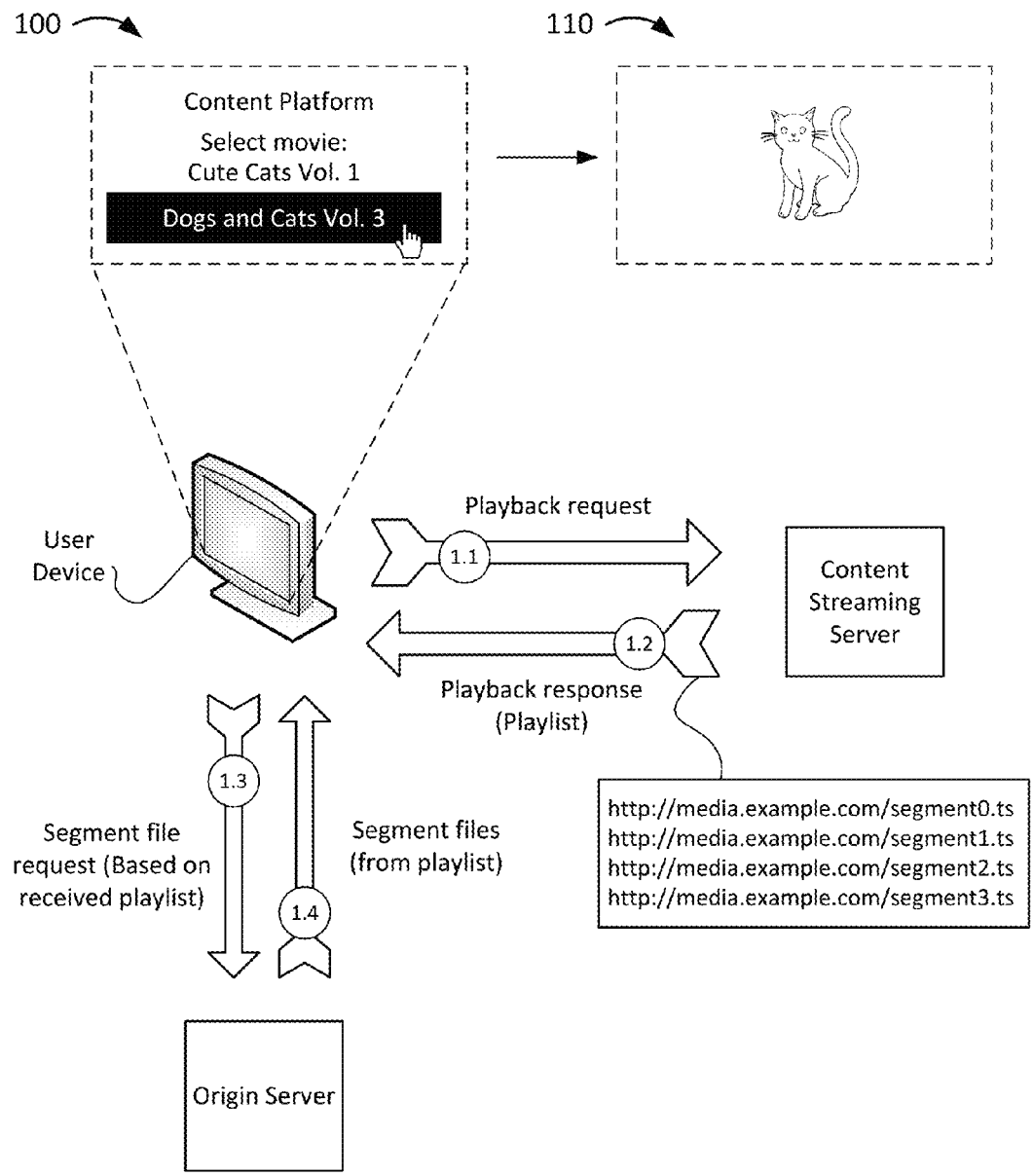
FIG. 1B-1C illustrate an example overview of an implementation described herein.
Figure 1C:
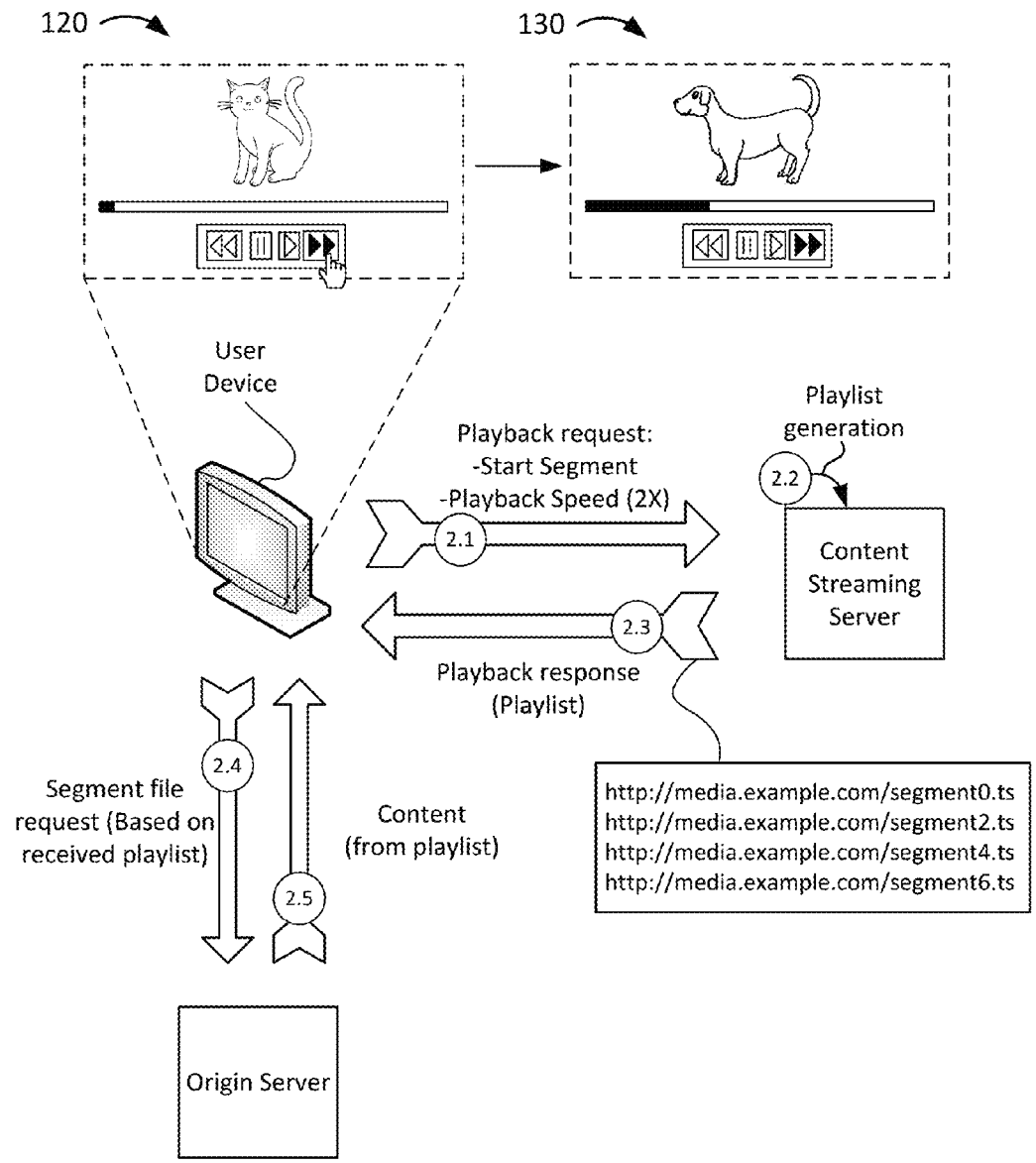

FIGS. 1B-1C illustrate an example overview of an implementation described herein. Referring to FIG. 1B, a user device may receive a request from a user (e.g., via user interface 100) to play back particular content (e.g., the content entitled "Dogs and Cats Vol. 3). Based on receiving the request, the user device may provide a playback request to a content streaming server (arrow 1.1), which may in turn provide a playlist (arrow 1.2) to the user device.

The playlist may identify segments of the requested content (e.g., segment files) and a sequence in which the segment files may be played back the user device in order for the user device to play back the requested content at 1× speed (e.g., a "normal" playback speed). The playlist may also identify a location of each segment file (e.g., a universal resource locator (URL)). For example, the playlist may identify the segment files "segment0.ts," "segment1.ts," "segment2.ts," etc., and URLs associated with these segment files. Based on receiving the playlist, the user device may request the segment files from an origin server (arrow 1.3), and may receive the segment files from the origin server (e.g., at arrow 1.4). The user device may then play back the segment files "segment0.ts," "segment1.ts," "segment2.ts," etc. in the order specified by the playlist, when playing the requested content at 1× speed (as shown in interface 110).

Referring to FIG. 1C, the user device may receive a selection to fast-forward playback of the content, as shown in interface 120 (e.g., a selection to fast-forward the content at 2× speed, 4× speed, 8× speed, or some other speed). When receiving the selection, the user device may provide a playback request to the content streaming server (arrow 2.1). The playback request may identify a start segment file (e.g., the segment file that the user device was playing when receiving the fast-forward selection). The playback request may also identify a playback speed corresponding to the fast-forward selection made by the user (e.g., a playback speed of a 2× speed, a 4× speed, an 8× speed, etc.).

In FIG. 1C, assume that the start segment file is "segment0.ts" and that the fast-forward speed, selected by the user, is 2×. Given these assumptions, the content streaming server may generate a playlist (arrow 2.2) identifying segment files that the user device may receive in order to begin play back of the content at a time index corresponding to the segment file "segment0.ts" and at a playback speed of 2× (e.g., 2 times a "normal" playback speed). In the example shown in FIG. 1C, the content streaming server may generate a playlist (e.g., a "2× playlist) identifying the segment files "segment0.ts," "segment2.ts," "segment4.ts," etc. The content streaming server may provide the playlist (arrow 2.3) to the user device, and the user device may request and receive the segment files identified in the playlist (arrows 2.4 and 2.5). The user device may then play back the segment files "segment0.ts," "segment2.ts," "segment4.ts," etc. in that sequence (interface 130), thus skipping playback of the segment files "segment1.ts," "segment3.ts," "segment 5.ts," etc.) and thereby playing back the content at the 2× speed.

As a result, playback of the content may be displayed at full-screen during fast-forward and rewind operations. Also, playback of the content may be displayed at a smoother frame rate during fast-forward and rewind operations in relation to when playback of the content is displayed in thumbnails. When the user later selects to resume playback the content at the 1× speed, the user device may provide a playback request identifying the playback speed of 1×, and the content streaming server may provide a playlist corresponding to the 1× speed (e.g., a playlist that may list the segment files without skipping segment files).

While the particular example in FIG. 1C describes a playback speed corresponding to a fast-forward selection, in practice, the playback speed may correspond to a rewind selection (e.g., a playback speed of −2×, −4×, etc.). In such an example, the playlist, provided by the content streaming server, may list segment files in reverse sequence. For example, for a −2× speed, the playlist may list the segment files in a sequence, such as "segmen6.ts," "segment4.ts," "segment2.ts," etc.

FIG. 2 is a diagram of an example environment 200 in which systems and/or methods described herein may be implemented. As shown in FIG. 2, environment 200 may include user device 210, content streaming server 220, origin server 230, and network 240.

User device 210 may include a device capable of communicating via a network, such as network 240. For example, user device 210 may correspond to a mobile communication device (e.g., a smart phone or a personal digital assistant (PDA)), a portable computer device (e.g., a laptop or a tablet computer), a desktop computing device, a gaming device, a set-top box, a television, or the like. User device 210 may receive selections for content playback via a user interface associated with a content playback application. User device 210 may communicate with content streaming server 220 and/or origin server 230 to receive content via HLS techniques and/or via some other technique.

Content streaming server 220 may include one or more computing devices, such as a server device or a collection of server devices. In some implementations, content streaming server 220 may receive a content playback request from user device 210, and may generate a playlist based on receiving the content playback request. In some implementations, content streaming server 220 may generate a playlist that user device 210 may use in order to play content at a particular time index and at a particular speed. For example, content streaming server 220 may generate a playlist having the segment files "segment2.ts," "segment3.ts," "segment4.ts," etc., to cause user device 210 to begin playback of content at a time index corresponding to "segment2.ts" and at a speed of 1×. As another example, content streaming server 220 may generate a playlist having the segment files "segment3.ts," "segment7.ts," "segment11.ts," etc. to cause user device 210 to begin playback of content at a time index corresponding to "segment3.ts" and at a speed of 4×. Content streaming server 220 may store information identifying the location of segment files (e.g., a URL associated the segment files), and may include this information in the playlist.

Origin server 230 may include one or more computing devices, such as a server device or a collection of server devices. In some implementations, origin server 230 may receive a request for segment files from user device 210. Origin server 230 may provide the segment files to user device 210 based on receiving the request. As described above, user device 210 may request the segment files that are identified in a playlist provided to user device 210 from content streaming server 220. In some implementations, origin server 230 may be implemented within or separately form content streaming server 220.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
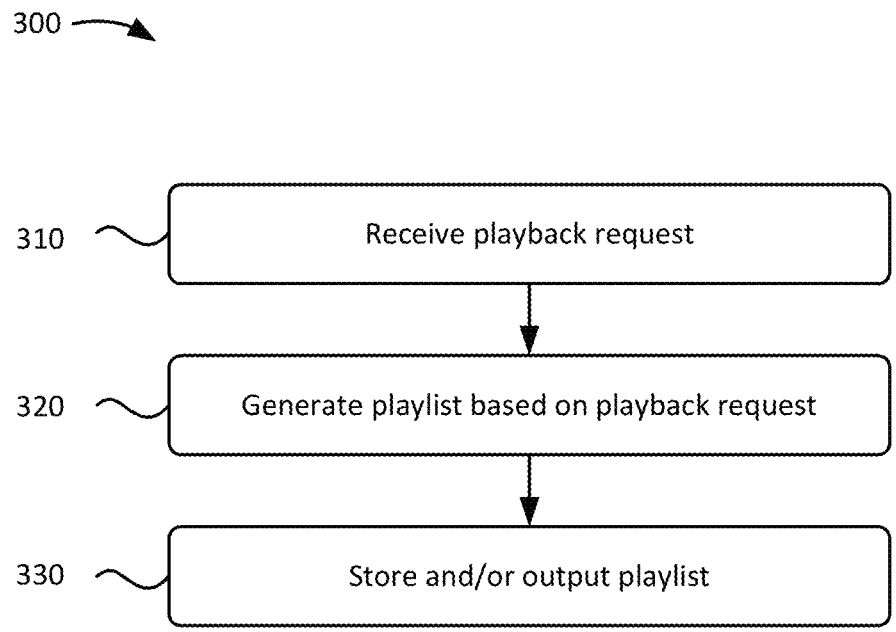
FIG. 3 illustrates a flowchart of an example process for generating a playlist and providing the playlist to a user device.

FIG. 3 illustrates a flowchart of an example process 300 for generating a playlist and providing the playlist to a user device. In some implementations, process 300 may be performed by content streaming server 220. In some implementations, some or all of blocks of process 300 may be performed by one or more other devices.

As shown in FIG. 3, process 300 may include receiving a playback request (block 310). For example, content streaming server 220 may receive the playback request, for a particular item of content, from user device 210. The playback request may identify the particular content, a start segment file and/or a time index, and a playback speed. In general, content streaming server 220 may receive a playback request when user device 210 receives a selection (e.g., from a user of user device 210) to play particular content, fast-forward playback of the particular content, rewind playback of the particular content, or resume playback of the particular at the 1× speed. As an example, assume that the user of user device 210 selects to play back particular content from the beginning (e.g., at the 0:00 time index) and at a 1× speed. Given this assumption, user device 210 may provide a playback request that identifies the particular content, the 0:00 time index of the particular content, and the 1× speed.

Continuing with the above example, assume that the user selects to fast-forward or rewind playback of the content at some point during which the user is viewing the content (e.g., at the 1:00 time index). Given this assumption, user device 210 may provide a playback request that identifies a starting segment file (e.g., the segment file corresponding to the 1:00 time index) and the fast-forward or rewind speed selected by the user (e.g., the speed 2×, 4×, 8×. −2×, −4×, −8×, etc.). Continuing with the above example, assume that, the user selects to resume playback of the content at the 1× speed after having fast-forwarded or rewound the playback of the content. Based on receiving this selection, user device 210 may provide another playback request that identifies the 1× playback speed and the starting segment file corresponding to the segment file that was playing at which the selection was received.

Process 300 may also include generating a playlist based on the playback request (block 320). For example, content streaming server 220 may generate the playlist based on the playback request received at block 310. In some implementations, the playlist may identify a sequence in which segment files should be played by user device 210. Content streaming server 220 may generate the playlist by determining segment files to include in the playlist and the sequence in which the segment files should be played by user device 210. Content streaming server 220 may then generate the playlist by listing the determined segment files in the determined sequence. Content streaming server 220 may determine the first segment as the start segment file identified in the playback request and/or based on a time index identified in the playback request. Content streaming server 220 may determine subsequent segment files to list in the playlist based on the playback speed identified in the playback request.

As an example, assume that particular content is 60 seconds in length and is associated with 60 segment files that are each one second in length (e.g., "segment1.ts" through "segment60.ts"). Further, assume "segment1.ts" is the first segment file associated with the content, "segment2.ts" is the second segment file associated with the content, "segment3.ts" is the third segment file associated with the content, and so on. Further, assume that the playback request identifies a playback speed of 1× and the start segment file is "segment1.ts" (and/or the starting time index is 0:00 or a beginning of the content). Given these assumptions, content streaming server 220 may generate a playlist listing "segment1.ts" as the first segment file, and "segment2.ts," segment3.ts," segment4.ts," etc. as the subsequent segment files.

As another example, assume that the playback speed is identified in the playback request as 2× and the starting segment file is identified as "segment9.ts." For instance, nine seconds into the playback of the content, the user may select to fast forward playback of the content. Given these assumptions, content streaming server 220 may generate a playlist listing "segment9.ts" as the first segment file and "segment11.ts," segment13.ts," segment15.ts," etc. as subsequent segment files. As another example, assume that the playback speed is identified in the playback request as 4× and the starting segment file is identified "segment9.ts." Given these assumptions, content streaming server 220 may generate a playlist listing "segment9.ts" as the first segment file and "segment13.ts," segment17.ts," segment21.ts," etc. as subsequent segment files. As another example, assume that the playback speed is identified in the playback request as −2× and the starting segment file is identified as "segment13.ts." Given these assumptions, content streaming server 220 may generate a playlist listing "segment13.ts" as the first segment file and "segment11.ts," segment9.ts," segment7.ts," etc. as subsequent segment files.

Since segment files are skipped based on the playback speed, the quantity of segment files identified in the playlist may be inversely proportional to a value of the playback speed at a given time index. For example, the quantity of segment files in the playlist corresponding to the 2× speed may be fewer than the quantity of segment files in the playlist corresponding to the 1× speed at a given time index. Similarly, the quantity of segment files for the −4× speed may be fewer than the quantity of segment files in the playlists corresponding to the −2× speed or the −1× speed, at a given time index.

In some implementations, content streaming server 220 may generate the playlist in a .m3u format, a .m3u8 format, and/or some other format. The playlist may identify multiple versions of each segment file. Each version may be encoded at a different bit rate, and user device 210 may select a particular version to play back based on network conditions and/or adaptive bit-rate techniques.

In some implementations, content streaming server 220 may provide an instruction to cause user device 210 to modify an existing playlist that user device 210 may currently be using to play back segment files. For example, based on determining the segment files and the sequence, as described above, content streaming server 220 may provide an instruction to cause user device 210 to modify the existing playlist based to cause user device 210 to play back the determined segment files in the sequence determined.

Process 300 may further include storing our outputting the playlist (block 330). For example, content streaming server 220 may output the playlist to user device 210 after generating the playlist as described above. Once user device 210 receives the playlist, user device 210 may request the segment files, identified in the playlist, from origin server 230, and may play the segment files in the sequence identified in the playlist. When user device 210 receives a playlist in response to providing a playback request identifying, user device 210 may present the content in a full-screen view, even when the playback request corresponds to a fast-forward or rewind selection.

Figure 4:
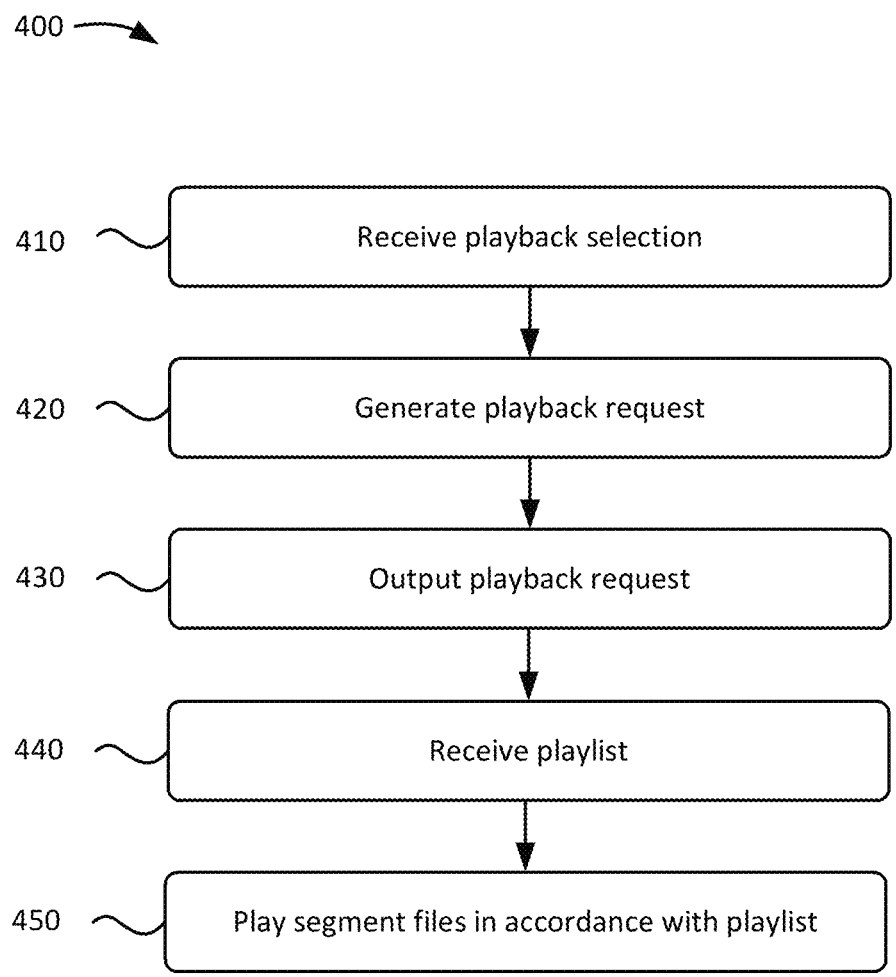
FIG. 4 illustrates a flowchart of an example process for presenting content in a full-screen view during fast-forward and rewind operations.

FIG. 4 illustrates a flowchart of an example process 400 for presenting content in a full-screen view during fast-forward and rewind operations. In some implementations, process 400 may be performed by user device 210. In some implementations, some or all of blocks of process 400 may be performed by one or more other devices.

As shown in FIG. 4, process 400 may include receiving a playback selection (block 410). For example, user device 210 may receive a playback selection from a user of user device 210 via a user interface. As described, the playback selection may identify particular content, a time index at which to begin playback of the particular content, and a playback speed. In some implementations, the playback selection may correspond to when the user makes a selection from a content platform home screen to play the content. Additionally, or alternatively, the playback selection may correspond to when the user selects to fast-forward or rewind the content during playback. Additionally, or alternatively, the playback selection may correspond to when the user selects to resume playback of the content at the 1× speed after selecting to fast-forward or rewind the content.

Process 400 may also include generating a playback request (block 420). For example, user device 210 may generate the playback request based on receiving the playback selection. In some implementations, the playback request may identify the particular content, the start segment file, and the playback speed. As an example, the playback request may identify a start segment file corresponding to the 1:00 time index, and may identify a 2× playback speed (e.g., when the user selects to fast-forward the content when the content is at the 1:00 time index).

Process 400 may further include outputting the playback request (block 430). For example, user device 210 may output the playback request to content streaming server 220 after generating the playback request. As described above, content streaming server 220 may generate a playlist based on the playback request, and provide the playlist to user device 210. Continuing with the above example, content streaming server 220 may generate a playlist that having the first segment file as the start segment file corresponding to the 0:00 time index (e.g., "segment0.ts,) and subsequent context files, such as "segment2.ts," "segment4.ts," etc.

Process 400 may also include receiving the playlist (block 440). For example, user device 210 may receive the playlist after content streaming server 220 generates the playlist in response to receiving the playback request as described above. Based on receiving the playlist, user device 210 may request and receive the segment files, identified in the playlist, from origin server 230.

Process 400 may also include playing the segment file sin accordance with the playlist (block 450). For example, user device 210 may play the segment files in the sequence identified in the playlist. Continuing with the above example, user device 210 may play the segment files "segment0.ts," "segment2.ts," "segment4.ts," etc. in that sequence. As a result, user device 210 may present the content in a full-screen view even when during fast-forward and rewind operations. Also, playback of the content may be displayed at a smoother frame rate during fast-forward and rewind operations in relation to when playback of the content is displayed in thumbnails.

Figure 5:
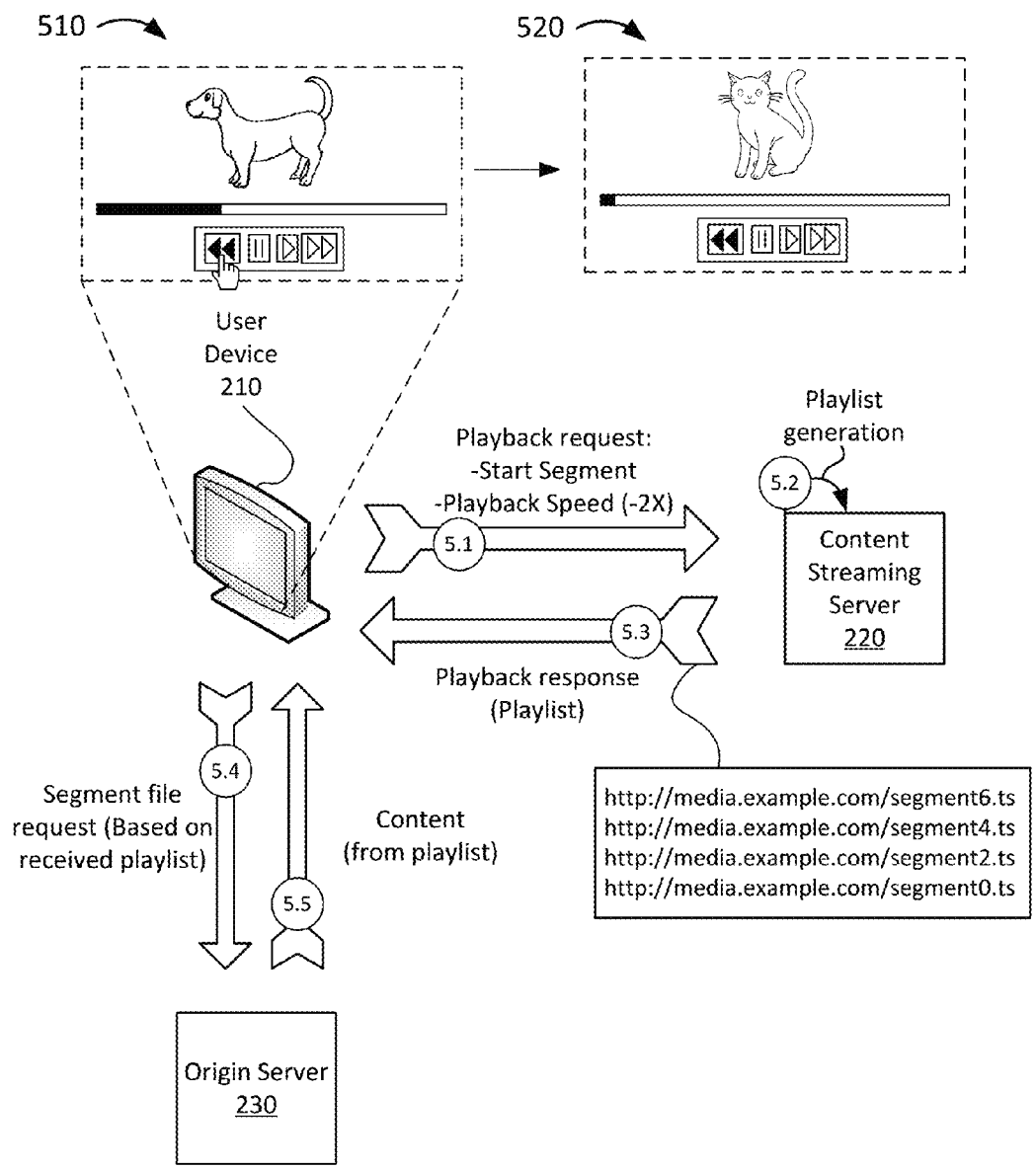
FIG. 5 illustrates an example implementation for presenting content in a full-screen view during a rewind operation.

FIG. 5 illustrates an example implementation for presenting content in a full-screen view during a rewind operation. As shown in FIG. 5, user device 210 may provide a playback request to content streaming server 220 (arrow 5.1) based on receiving a selection to rewind the playback of content at 2× speed (as shown in interface 510). The playback request may identify a start segment file and/or at a time index (e.g., the start segment file that user device 210 was playing when receiving the rewind selection, such as the segment file "segment6.ts" or a time index corresponding to the segment file), and a playback speed (e.g. a −2× playback speed). Based on receiving the playback request, content streaming server 220 may generate a playlist (arrow 5.2) that lists segment files that user device 210 may receive in order to play back the content at the −2× speed and begin playback at a time index corresponding to the start segment file. As shown in FIG. 5, content streaming server 220 may provide the playlist to user device 210 (arrow 5.3). In the example shown in FIG. 5, the playlist may list the segment files "segment6.ts," "segment4.ts," "segment2.ts," and "segment0.ts." The playlist may also identify a URL associated with each segment file. Based on receiving the playlist, user device 210 may request and receive the segment files from origin server 230 (arrows 5.4 and 5.5), and may play back the segment files in the sequence identified in the playlist, thereby playing back the content in full-screen at the −2× speed (as shown in interface 520).

Figure 6A:
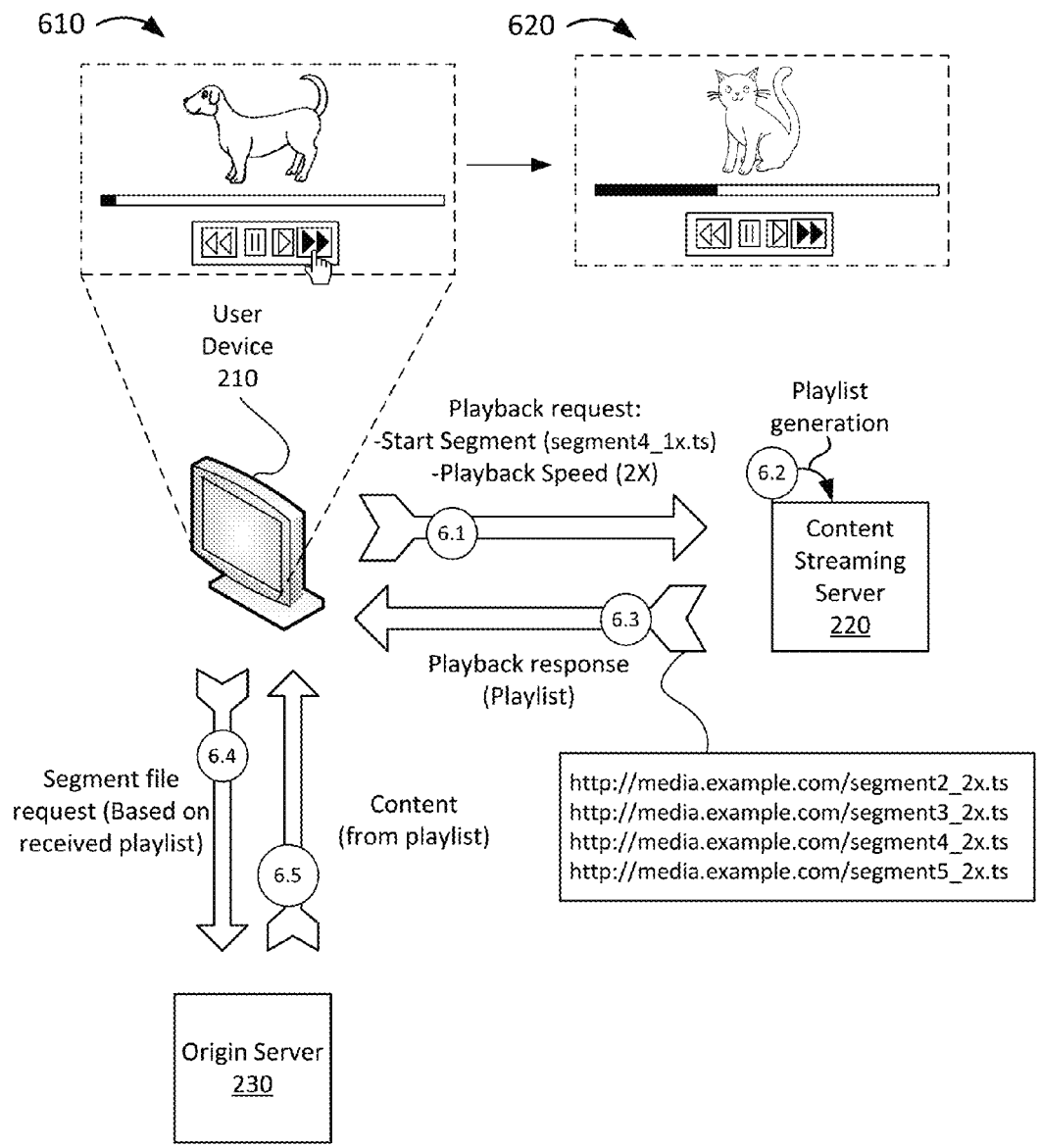
FIGS. 6A and 6B illustrate an example implementation for presenting content in a full-screen view during a fast-forward operation.
Figure 6B:
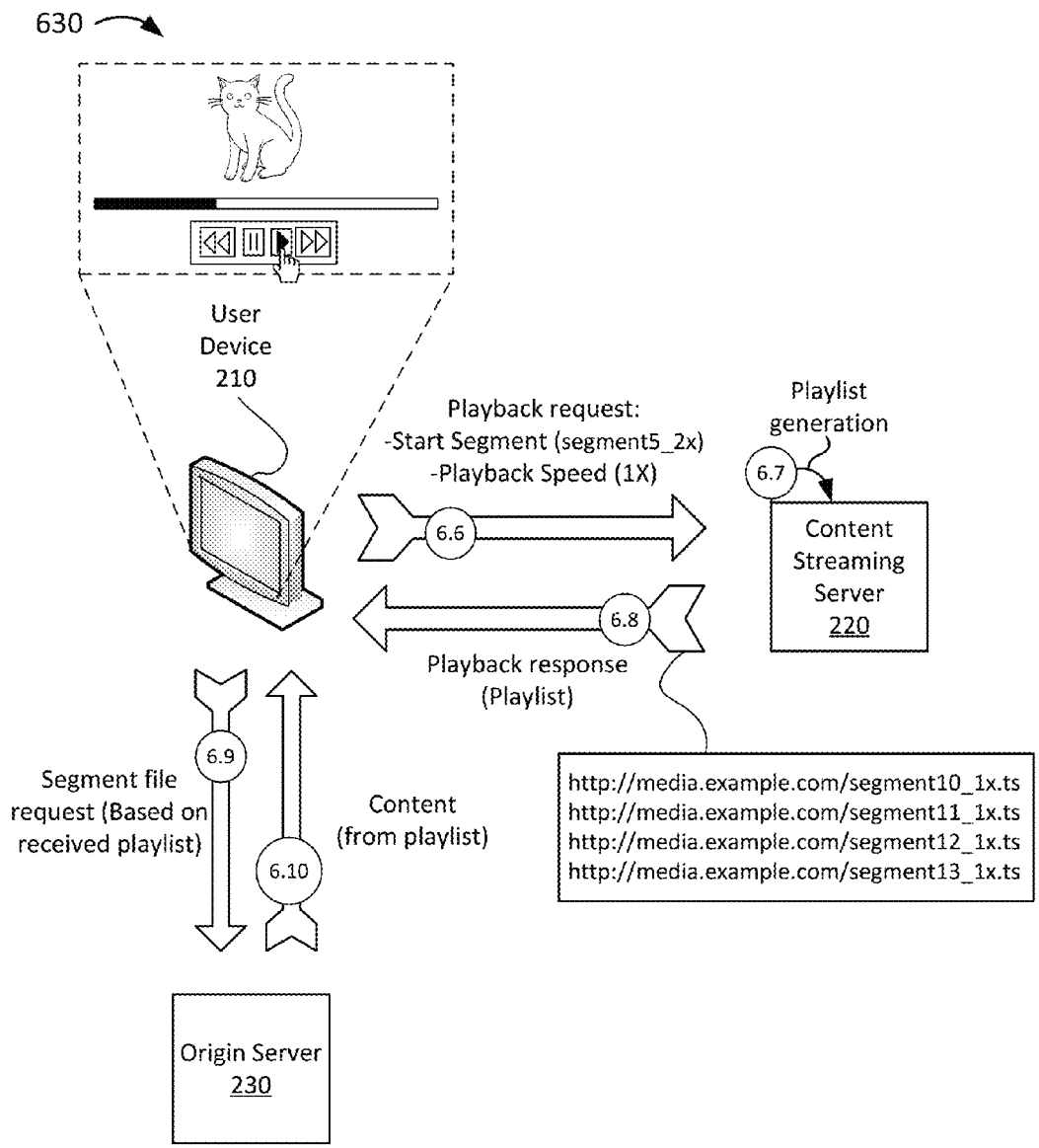

FIGS. 6A and 6B illustrate an example implementation for presenting content in a full-screen view during a fast-forward operation. As shown in FIG. 6A, user device 210 may provide a playback request to content streaming server 220 (arrow 6.1) based on receiving a selection to fast-forward the playback of content at 2× speed (as shown in interface 610).

The playback request may identify a start segment file and/or at a time index (e.g., the start segment file that user device 210 was playing when receiving the fast-forward selection, such as the segment file "segment4_1x.ts" or a time index corresponding to the segment file), and a playback speed (e.g. a 2× playback speed). Based on receiving the playback request, content streaming server 220 may generate a playlist (arrow 6.2) that lists segment files that user device 210 may receive in order to play back the content at the 2× speed and begin playback at a time index corresponding to the start segment file. For example, the playlist may include segment files of content encoded at the 2× speed. The playlist may list these segment files in order without skipping segment files. Content streaming server 220 may determine a first segment file to include in the playlist corresponding to the time index of the start segment file identified by user device 210. As an example, assume that the start segment file, identified by user device 210 (e.g. "segment4_1x.ts"), corresponds to the 0:04 time index. Content streaming server 220 may determine the segment file at the 2× speed corresponding to the 0:04 time index, such as the segment file "segment2_2x.ts." The segment file "segment2_2x.ts" may correspond to the 0:02 time index at the 2× speed, which may therefore correspond to the 0:04 time index at the 1× speed.

As shown in FIG. 6A, content streaming server 220 may provide the playlist to user device 210 (arrow 6.3). In the example shown in FIG. 6A, the playlist may list the segment files "segment2_2x.ts," "segment3_2x.ts," "segment4_2x.ts," and "segment5_2x.ts." The playlist may also identify a URL associated with each segment file. Based on receiving the playlist, user device 210 may request and receive the segment files from origin server 230 (arrows 6.4 and 6.5), and may play back the segment files in the sequence identified in the playlist, thereby playing back the content in full-screen at the 2× speed (as shown in interface 620).

Referring to FIG. 6B, user device 210 may provide a playback request to content streaming server 220 (arrow 6.6) based on receiving a selection to fast-forward the playback of content at 2× speed (as shown in interface 630).

The playback request may identify a start segment file and/or at a time index (e.g., the start segment file that user device 210 was playing when receiving the fast-forward selection, such as the segment file "segment5_2x.ts" or a time index corresponding to the segment file), and a playback speed (e.g. a 1× playback speed). Based on receiving the playback request, content streaming server 220 may generate a playlist (arrow 6.7) that lists segment files that user device 210 may receive in order to play back the content at the 1× speed and begin playback at a time index corresponding to the start segment file. Content streaming server 220 may determine a first segment file to include in the playlist corresponding to the time index of the start segment file identified by user device 210. As an example, content streaming server 220 may determine the segment file "segment5_2x.ts" corresponds to the 0:05 time index at the 2× speed or the 0:10 time index at the 1× speed. Content streaming server 220 may determine that the segment file "segment10_1x.ts" corresponds to the 0:10 time index at the 1× speed.

As shown in FIG. 6B, content streaming server 220 may provide the playlist to user device 210 (arrow 6.8). In the example shown in FIG. 6B, the playlist may list the segment files "segment10_1x.ts," "segment11_1x.ts," "segment12_1x.ts," and "segment13_1x.ts." The playlist may also identify a URL associated with each segment file. Based on receiving the playlist, user device 210 may request and receive the segment files from origin server 230 (arrows 6.9 and 6.10), and may play back the segment files in the sequence identified in the playlist, thereby playing back the content in full-screen at the 2× speed (as shown in interface 620).

While particular examples are shown in FIGS. 5, 6A, and 6B, the above description is merely an example implementation. In practice, other examples are possible from what is described above in FIGS. 5, 6A, and 6B.

Figure 7:
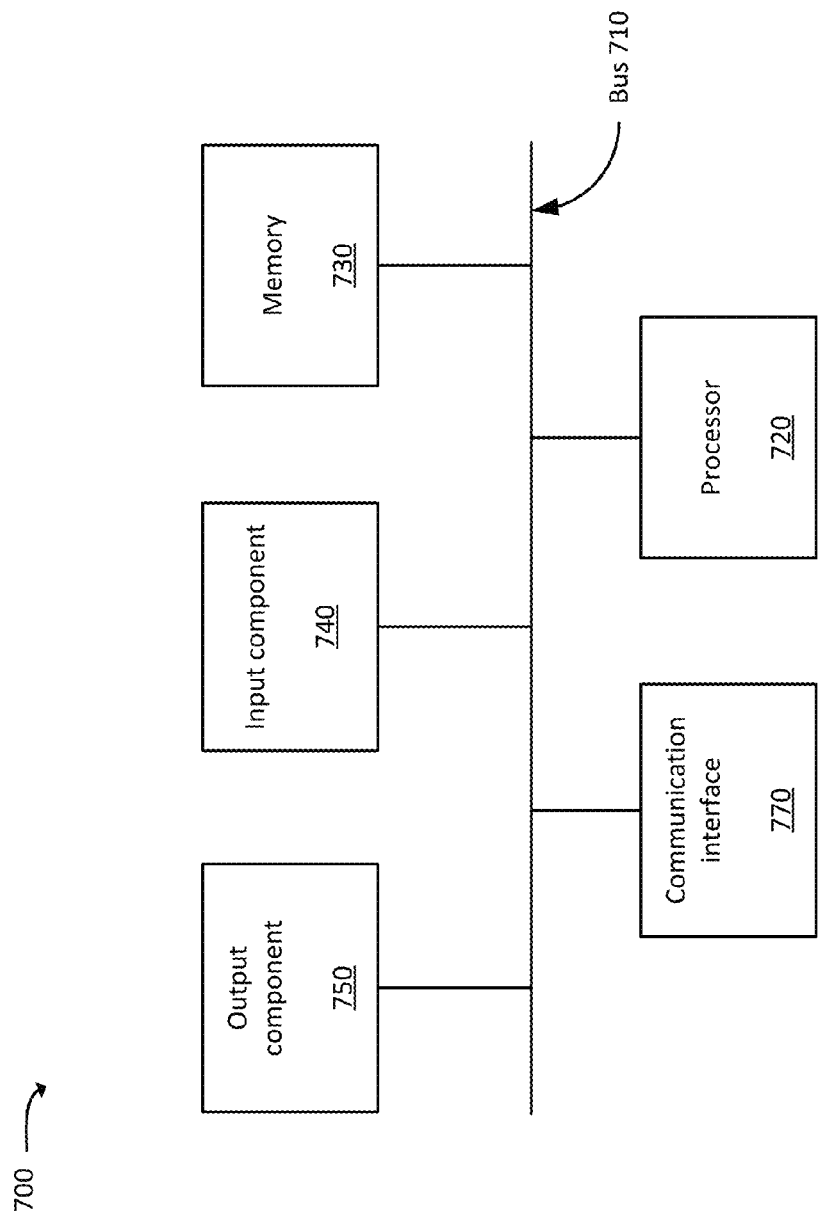
FIG. 7 illustrates example components of one or more devices, according to one or more implementations described herein.

FIG. 7 is a diagram of example components of device 700. One or more of the devices described above (e.g., with respect to FIGS. 1A-1C, 2, 5, 6A, and 6B) may include one or more devices 700. Device 700 may include bus 710, processor 720, memory 730, input component 740, output component 750, and communication interface 770. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 770 may include any transceiver-like mechanism that enables device 700 to communicate with other devices and/or systems. For example, communication interface 770 may include an Ethernet interface, an optical interface, a coaxial interface, or the like. Communication interface 770 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 770. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a server device and from a user device, a playback request that identifies particular content, wherein the particular content is associated with a plurality of segment files, which, when played in sequence, present the particular content at a 1× speed, the playback request being a request for the content to be presented at the 1× speed;
   receiving, by the server device and from the user device, a playback modification request, the playback modification request indicating a time index and a playback speed;
   determining, by the server device, a first segment file, of the plurality of segment files associated with the particular content, that corresponds to the time index;
   skipping, by the server device, a particular quantity of subsequent segment files, after the first segment file, the particular quantity being determined based on the playback speed;
   identifying, by the server device, a second segment file, of the plurality of segment files, immediately following the skipped particular quantity of subsequent segment files;

generating, by the server device, a playlist that specifies at least the identified second segment file, and does not specify any of the skipped segment files, the playlist further specifying a plurality of versions of the second segment file, each version corresponding to a different bit rate; and outputting, by the server device and to the user device, the playlist, wherein the user device selects a particular version to play based on network conditions.

2. The method of claim 1, wherein the playback speed, indicated in the playback modification request, is a speed other than the 1× playback speed.

3. The method of claim 2, wherein the user device sequentially plays the segment files, specified in the playlist, in a sequence identified in the playlist, wherein the sequential playing results in the indicated playback speed that is other than the 1× speed.

4. The method of claim 1, wherein the playback speed, indicated in the playback modification request, corresponds to a fast-forward or rewind operation.

5. The method of claim 1, wherein the playback speed, indicated in the playback modification request, is inversely proportional to a quantity of segment files identified in the playlist.

6. The method of claim 1,
wherein a segment file, listed first in the playlist, is the first segment file.

7. The method of claim 6,
wherein the playlist lists the second segment file immediately subsequent to the first segment file.

8. The method of claim 1, wherein generating the playlist includes modifying an existing playlist based on identifying the second segment file.

9. A system comprising:
a non-transitory memory device storing:
  a plurality of processor-executable instructions; and
a processor configured to execute the processor-executable instructions, wherein executing the processor-executable instructions causes the processor to:
  receive, from a user device, a playback request that identifies particular content, wherein the particular content is associated with a plurality of segment files, which, when played in sequence, present the particular content at a 1× speed;
  receive, from the user device, a playback modification request, the playback modification request indicating a time index and a playback speed;
  determine a first segment file, of the plurality of segment files associated with the particular content, that corresponds to the time index;
  skip a particular quantity of subsequent segment files, after the first segment file, the particular quantity being determined based on the playback speed;
  identify a second segment file, of the plurality of segment files, immediately following the skipped particular quantity of subsequent segment files;
  generate a playlist that specifies at least the identified second segment file, and does not specify any of the skipped segment files, the playlist further specifying a plurality of versions of the second segment file, each version corresponding to a different bit rate; and
  output the playlist to the user device, wherein the user device selects a particular version to play based on network conditions.

10. The system of claim 9, wherein the user device plays the segment files, specified in the playlist, in a sequence identified in the playlist.

11. The system of claim 9, wherein the playback speed, indicated in the playlist, is a speed other than the 1× playback speed.

12. The system of claim 9, wherein the playback speed, indicated in the playlist, corresponds to a fast-forward or rewind operation.

13. The system of claim 9, wherein the playback speed, indicated in the playlist, is inversely proportional to a quantity of segment files identified in the playlist.

14. The system of claim 9,
wherein a segment file, listed first in the playlist, is the first segment file.

15. The system of claim 14,
wherein the playlist lists the second segment file immediately subsequent to the first segment file.

16. The system of claim 9, wherein executing the processor-executable instructions, to generate the playlist, causes the processor to modify an existing playlist based on identifying the second segment file.

17. A method comprising:
playing, by a user device, content;
receiving, by the user device, a selection of a playback speed that is other than a 1× playback speed;
generating, by the user device, a playback request,
  the playback request identifying particular content, a time index, and the selected playback speed that is other than the 1× playback speed;
providing, by the user device, the playback request to a server device, wherein the server device generates a playlist based on the time index and the selected playback speed;
receiving, by the user device, the playlist generated by the server device,
  the playlist identifying a first segment file, corresponding to the time index, and one or more second segment files, associated with the particular content, and a sequence in which the first segment file and the one or more second segment files should be played by the user device,
  the first segment file and the one or more second segment files corresponding to non-continuous segments of the particular content,
  the playlist further specifying a plurality of versions of the first and second segment files, each version corresponding to a different bit rate; and
playing, by the user device, a particular version of the first segment file and the one or more second segment files in the sequence identified in the playlist, wherein the user device selects a particular version to play based on network conditions.

18. The method of claim 17, wherein the playback speed corresponds to a fast-forward or rewind operation.

19. The method of claim 17, wherein generating the playback request is based on receiving a playback selection from a user of the user device,
  the playback selection identifying the particular content, a time index corresponding to the first segment file, and the playback speed.

20. The method of claim 17, wherein playing the first segment file and the one or more second segment files in the sequence identified in the playlist includes displaying playback of the first segment file and the one or more second segment files in a full-screen view.

\* \* \* \* \*